(12) United States Patent
Jung et al.

(10) Patent No.: US 12,341,157 B2
(45) Date of Patent: Jun. 24, 2025

(54) LITHIUM-SULFUR BATTERY ELECTROLYTE AND LITHIUM-SULFUR BATTERY INCLUDING SAME

(71) Applicant: LG ENERGY SOLUTION, LTD., Seoul (KR)

(72) Inventors: Unho Jung, Daejeon (KR); Jaegil Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 652 days.

(21) Appl. No.: 17/624,479

(22) PCT Filed: Mar. 3, 2021

(86) PCT No.: PCT/KR2021/002627
§ 371 (c)(1),
(2) Date: Jan. 3, 2022

(87) PCT Pub. No.: WO2021/177723
PCT Pub. Date: Sep. 10, 2021

(65) Prior Publication Data
US 2022/0376300 A1  Nov. 24, 2022

(30) Foreign Application Priority Data

Mar. 6, 2020 (KR) .......... 10-2020-0028074
Feb. 26, 2021 (KR) .......... 10-2021-0026125

(51) Int. Cl.
| | |
|---|---|
| *H01M 10/0567* | (2010.01) |
| *H01M 4/38* | (2006.01) |
| *H01M 4/40* | (2006.01) |
| *H01M 4/58* | (2010.01) |
| *H01M 10/052* | (2010.01) |
| *H01M 10/0568* | (2010.01) |
| *H01M 10/0569* | (2010.01) |
| *H01M 4/02* | (2006.01) |

(52) U.S. Cl.
CPC ....... *H01M 10/0567* (2013.01); *H01M 4/382* (2013.01); *H01M 4/405* (2013.01); *H01M 4/58* (2013.01); *H01M 10/052* (2013.01); *H01M 10/0568* (2013.01); *H01M 10/0569* (2013.01); *H01M 2004/027* (2013.01); *H01M 2004/028* (2013.01); *H01M 2300/0028* (2013.01)

(58) Field of Classification Search
CPC .. H01M 10/0567; H01M 4/382; H01M 4/405; H01M 4/58; H01M 10/052; H01M 10/0569; H01M 2004/027; H01M 2004/028; H01M 2300/0028
See application file for complete search history.

(56) References Cited

U.S. PATENT DOCUMENTS

| | | | |
|---|---|---|---|
| 6,350,542 B1 | 2/2002 | Gan et al. | |
| 2002/0045102 A1* | 4/2002 | Jung | H01M 4/5815 |
| | | | 429/105 |
| 2005/0053839 A1 | 3/2005 | Ryu et al. | |
| 2006/0147809 A1 | 7/2006 | Amine et al. | |
| 2008/0305402 A1 | 12/2008 | Kato et al. | |
| 2010/0119956 A1 | 5/2010 | Tokuda et al. | |
| 2013/0183576 A1* | 7/2013 | Suguro | H01M 4/131 |
| | | | 429/336 |
| 2014/0141342 A1* | 5/2014 | Lim | H01M 10/052 |
| | | | 429/188 |
| 2014/0356709 A1 | 12/2014 | Arikawa et al. | |
| 2019/0051940 A1* | 2/2019 | Park | H01M 10/0569 |

FOREIGN PATENT DOCUMENTS

| | | |
|---|---|---|
| CN | 1336696 A | 2/2002 |
| CN | 101208266 A | 6/2008 |
| CN | 102544585 A | 7/2012 |
| CN | 104106162 A | 10/2014 |
| CN | 108808092 A | 11/2018 |
| CN | 108987803 A | 12/2018 |
| CN | 109258887 A | 1/2019 |
| CN | 109616698 * | 2/2020 |
| CN | 109616698 B | 2/2020 |
| CN | 110854437 A | 2/2020 |
| EP | 1 178 555 A2 | 2/2002 |
| JP | 7-153487 A | 6/1995 |
| JP | 7-320779 A | 12/1995 |
| JP | 11-67270 A | 3/1999 |
| JP | 2002-75446 A | 3/2002 |
| JP | 2005-85760 A | 3/2005 |
| JP | 2008-277004 A | 11/2008 |
| JP | 4348908 B2 | 10/2009 |
| JP | 4569129 B2 | 10/2010 |
| JP | 2018-519620 A | 7/2018 |
| KR | 2001-0074419 A | 8/2001 |
| KR | 10-2005-0038895 A | 4/2005 |
| KR | 10-2005-0038896 A | 4/2005 |
| KR | 10-2010-0014725 A | 2/2010 |
| KR | 10-2013-0008174 A | 1/2013 |
| KR | 10-2013-0079126 A | 7/2013 |
| KR | 10-2014-0001693 A | 1/2014 |
| KR | 20140001693 * | 3/2014 |
| KR | 10-2016-0034183 A | 3/2016 |

(Continued)

OTHER PUBLICATIONS

CN109616698MT (Year: 2020).*

(Continued)

*Primary Examiner* — Alexander Usyatinsky
(74) *Attorney, Agent, or Firm* — Birch, Stewart, Kolasch & Birch, LLP

(57) ABSTRACT

Disclosed is an electrolyte for a lithium-sulfur battery and a lithium-sulfur battery including the same, more specifically an electrolyte for a lithium-sulfur battery including a lithium salt, a non-aqueous organic solvent, and an additive, wherein the additive includes a sulfide compound. The electrolyte for the lithium-sulfur battery improves the efficiency and stability of the negative electrode, thereby improving the capacity and lifetime characteristics of the lithium-sulfur battery.

10 Claims, 4 Drawing Sheets

(56) References Cited

FOREIGN PATENT DOCUMENTS

| KR | 10-2016-0052351 A | 5/2016 |
| KR | 10-2018-0114631 A | 10/2018 |
| WO | WO 2006/137177 A1 | 12/2006 |
| WO | WO 2012/029653 A1 | 3/2012 |
| WO | WO 2020/015234 A1 | 1/2020 |

OTHER PUBLICATIONS

The decision of JPO to grant a Patent for Application JP 2022505497 (Year: 2023).*
The decision of SIPO to grant a Patent for Application CN.2012180004397 (Year: 2024).*
International Search Report for PCT/KR2021/002627 mailed on Jun. 18, 2021.
Qian et al., "High rate and stable cycling of lithium metal anode", Nature Communications, 2015, vol. 6, Article No. 6362, pp. 1-9.
Extended European Search Report European Application No. 21765063.9, dated Aug. 18, 2022.
Eftekhari, "The Rise of Lithium-Selenium Batteries," Sustainable Energy & Fuels, 2017, pp. 1-34.

* cited by examiner

LITHIUM-SULFUR BATTERY ELECTROLYTE AND LITHIUM-SULFUR BATTERY INCLUDING SAME

TECHNICAL FIELD

This application claims the benefits of Korean Patent Application No. 10-2020-0028074 on Mar. 6, 2020 with the Korean Intellectual Property Office, and Korean Patent Application No. 10-2021-0026125 on Feb. 26, 2021 the Korean Intellectual Property Office, the disclosure of which are herein incorporated by reference in their entirety.

The present invention relates to an electrolyte for a lithium-sulfur battery and a lithium-sulfur battery including the same.

BACKGROUND ART

As the application range of lithium secondary batteries extends to not only portable electronic devices, but also electric vehicles (EV) and electric storage systems (ESS), demand for lithium secondary batteries with high capacity, high energy density, and long lifetime is increasing.

Among various lithium secondary batteries, a lithium-sulfur battery is a battery system that uses a sulfur-based material containing a sulfur-sulfur bond as a positive electrode active material, and uses lithium metal, a carbon-based material capable of intercalating/deintercalating lithium ions, or silicon, tin or the like, which forms an alloy with lithium, as a negative electrode active material.

In the lithium-sulfur battery, there is an advantage that sulfur, which is the main material of the positive electrode active material, has a low atomic weight, is very rich in resources and thus easy to supply and receive, and is cheap, non-toxic, and environmentally friendly.

In addition, the lithium-sulfur battery has a theoretical specific capacity of 1,675 mAh/g from the conversion reaction of lithium ions and sulfur ($S_8+16Li^++16e^-\rightarrow 8Li_2S$) in the positive electrode, and when lithium metal is used as the negative electrode, the theoretical energy density of 2,600 Wh/kg is shown. Since the theoretical energy density of the lithium-sulfur battery is much higher than the theoretical energy density of other battery systems (Ni-MH battery: 450 Wh/kg, Li—FeS battery: 480 Wh/kg, Li—MnO$_2$ battery: 1,000 Wh/kg, Na—S battery: 800 Wh/kg) and lithium ion battery (250 Wh/kg) currently under study, the lithium-sulfur battery is attracting attention as a high-capacity, eco-friendly, and inexpensive lithium secondary battery among the secondary batteries developed so far.

Specifically, in the case of a lithium-sulfur battery, when lithium metal is used as the negative electrode active material, since the theoretical specific capacity is very high as 3,860 mAh/g, and the standard reduction potential (Standard Hydrogen Electrode; SHE) is also very low as −3.045 V, it is possible to realize a battery with high capacity and high energy density, so several studies are being conducted as a next-generation battery system.

However, as lithium metal, which is a negative electrode active material, reacts easily with the electrolyte due to its high chemical/electrochemical reactivity, a passivation layer is formed on the surface of the negative electrode. Such a passivation layer causes a local difference in current density, thereby forming lithium dendrite on the surface of lithium metal. In addition, the lithium dendrite formed in this way causes an internal short circuit and inert lithium (dead lithium) of the battery, thereby causing problems of increasing the physical and chemical instability of the lithium secondary battery, as well as reducing the battery capacity and reducing the cycle lifetime.

Due to the high instability of lithium metal as described above, the lithium-sulfur battery using lithium metal as a negative electrode has not been commercially available.

Accordingly, various methods such as a method of introducing a protective layer on the surface of lithium metal or a method of varying the composition of an electrolyte are being studied.

As an example, Korean Patent Publication No. 2016-0034183 discloses that the loss of the electrolyte and the generation of dendrites can be prevented by forming a protective layer as a polymer matrix capable of accumulating the electrolyte while protecting the negative electrode on the negative electrode active layer containing lithium metal or lithium alloy.

In addition, Korean Patent Publication No. 2016-0052351 discloses that the stability and lifetime characteristics of the lithium secondary battery can be improved by incorporating an absorbent material for lithium dendrite into the polymer protective film formed on the surface of lithium metal and thus suppressing the growth of lithium dendrite.

In addition, Jiangfeng Qian et al. and Korean Patent Publication No. 2013-0079126 disclose that the characteristics of a battery comprising lithium metal can be improved by increasing the concentration of each lithium salt or by incorporating a non-aqueous organic solvent comprising 1,3,5-trioxane, 1,3-dioxolane, and fluorine-based cyclic carbonate.

These prior arts suppressed the reaction between the electrolyte and lithium metal or the formation of lithium dendrite to some extent, but the effect was not sufficient. Also, there is a problem of degeneration such as hardening or expansion of the protective layer as the charging/discharging of the battery proceeds. In addition, when an electrolyte comprising a specific composition is used, there are limitations in applicable batteries and may cause a problem of deteriorating performance of the battery. Therefore, there is still a need to develop a lithium-sulfur battery having excellent capacity and lifetime characteristics by improving the efficiency and stability of a lithium metal negative electrode.

Prior Art Document

Patent Document

Korean Patent Publication No. 2016-0034183 (Mar. 29, 2016), NEGATIVE ELECTRODE FOR RECHARGEABLE LITHIUM BATTERY AND RECHARGEABLE LITHIUM BATTERY COMPRISING SAME Korean Patent Publication No. 2016-0052351 (May 12, 2016), LITHIUM METAL ELECTRODE FOR LITHIUM SECONDARY BATTERY WITH SAFE PROTECTIVE LAYER AND LITHIUM SECONDARY BATTERY COMPRISING THE SAME Korean Patent Publication No. 2013-0079126 (Jul. 10, 2013), ELECTROLYTE FOR LITHIUM METAL BATTERY AND LITHIUM METAL BATTERY INCLUDING THE SAME

Non-patent Document

Jiangfeng Qian et al., High rate and stable cycling of lithium metal anode, Nature Communications 2015, 6, 6362

DISCLOSURE

Technical Problem

As a result of conducting various studies to solve the above problems, the inventors of the present invention have confirmed that when incorporating a sulfide compound as an additive into the electrolyte for a lithium-sulfur battery, the efficiency and stability of the negative electrode containing lithium metal can be improved, thereby improving the capacity and lifetime of the lithium-sulfur battery, and thus have completed the present invention.

Accordingly, it is an object of the present invention to provide an electrolyte for a lithium-sulfur battery capable of implementing the lithium-sulfur battery having excellent capacity and lifetime characteristics.

In addition, it is another object of the present invention to provide a lithium-sulfur battery including the electrolyte.

Technical Solution

In order to achieve the above objects, the present invention provides an electrolyte for a lithium-sulfur battery comprising a lithium salt, a non-aqueous organic solvent, and an additive, wherein the additive comprises a sulfide compound.

The sulfide compound may comprise at least one selected from the group consisting of methyl sulfide, ethyl sulfide, propyl sulfide, isopropyl sulfide, butyl sulfide, phenyl sulfide, benzyl sulfide, benzyl methyl sulfide, and ethyl phenyl sulfide.

The non-aqueous organic solvent may comprise an ether-based compound and a heterocyclic compound including one or more double bonds.

The ether-based compound may comprise a linear ether compound.

The heterocyclic compound may include at least one hetero atom selected from the group consisting of an oxygen atom and a sulfur atom.

The non-aqueous organic solvent may comprise the ether-based compound and the heterocyclic compound in a volume ratio of 95:5 to 5:95.

The lithium salt may be at least one selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiC$_4$BO$_8$, LiAsF$_6$, LiSbF$_6$, LiAlCl$_4$, CH$_3$SO$_3$Li, CF$_3$SO$_3$Li, (CF$_3$SO$_2$)$_2$NLi, (CF$_2$F$_5$SO$_2$)$_2$NLi, (SO$_2$F)$_2$NLi, (CF$_3$SO$_2$)$_3$CLi, lithium chloroborane, lithium lower aliphatic carboxylates having 4 or less carbon atoms, lithium tetraphenyl borate, and lithium imide.

The additive may be comprised in an amount of 0.1 to 30% by weight based on a total of 100% by weight of the electrolyte for the lithium-sulfur battery.

In addition, the present invention provides a lithium-sulfur battery comprising the electrolyte for the lithium-sulfur battery.

Advantageous Effects

As the electrolyte for the lithium-sulfur battery according to the present invention comprises a sulfide compound as an additive, it not only improves the efficiency and stability of the negative electrode including lithium metal, but also maximizes the capacity expression of the positive electrode, thereby enabling high capacity and long lifetime of the lithium-sulfur battery.

BEST MODE

Figure 1:
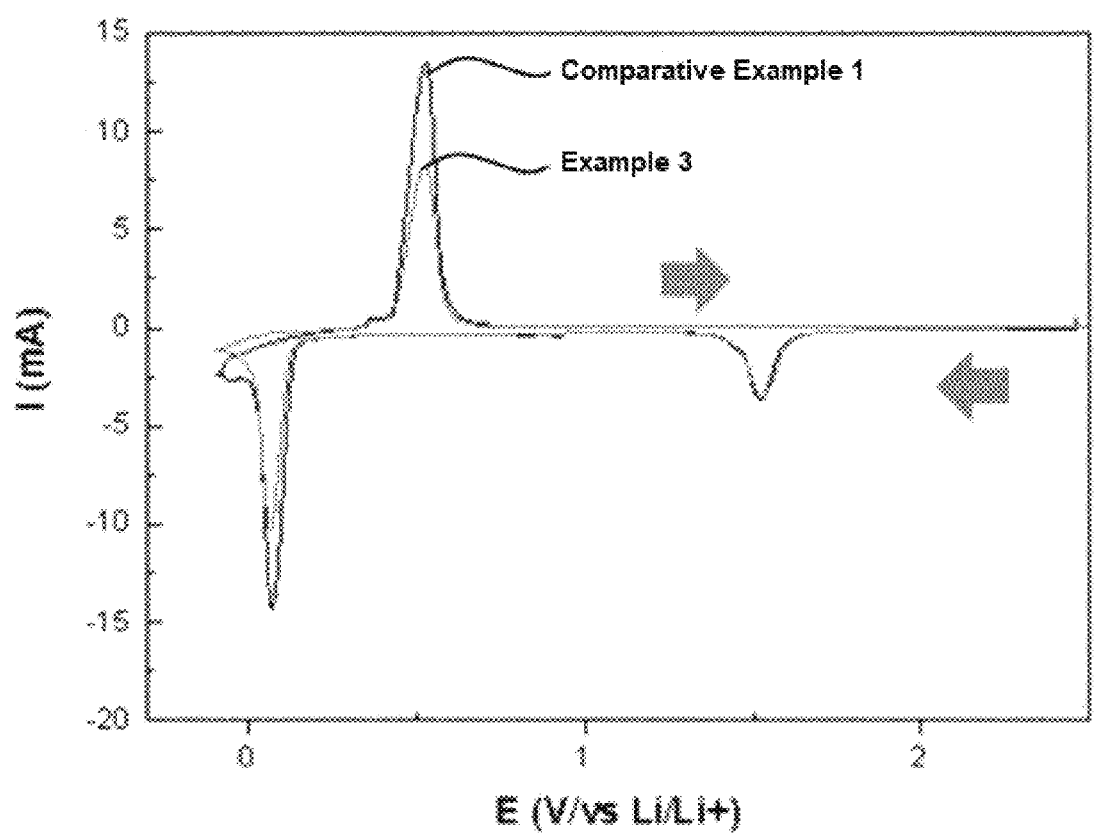
FIG. 1 is a graph showing the results of cyclic voltammetry analysis of electrolytes according to Example 3 and Comparative Example 1.

Hereinafter, the present invention will be described in more detail.

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

The terminology used herein is for the purpose of describing particular embodiments only and is not intended to be limiting of the invention. The singular forms "a," "an," and "the" comprise plural referents unless the context clearly dictates otherwise. It is to be understood that the terms such as "comprise" or "have" as used in the present specification, are intended to designate the presence of stated features, numbers, steps, operations, components, parts or combinations thereof, but not to preclude the possibility of the presence or addition of one or more other features, numbers, steps, operations, components, parts, or combinations thereof.

The term "composite" as used herein refers to a material that two or more materials are combined to express a more effective function while forming physically and chemically different phases to each other.

The term "polysulfide" as used herein is a concept comprising both "polysulfide ion (S$_x^{2-}$, x=8, 6, 4, 2)" and "lithium polysulfide (Li$_2$S$_x$ or LiS$_x^-$, x=8, 6, 4, 2)".

The lithium secondary battery, which has remained in the market limited for use in portable electronic devices, is rapidly expanding into the market of electric vehicles (EV) or energy storage systems, and thus, in accordance with their trend of light weight short and small, weight reduction and miniaturization are also required for the lithium secondary battery, which is their operating energy sources.

Among several secondary batteries, the lithium-sulfur battery exhibits high theoretical discharging capacity and theoretical energy density, and also lithium metal, which is mainly used as a negative electrode active material, has a very small atomic weight (6.94 g/a.u.) and density (0.534 g/cm$^3$), and thus the lithium-sulfur battery is in the spotlight as a next-generation battery due to its ease of miniaturization and weight reduction.

However, as described above, lithium metal has high reactivity. Therefore, when the electrolyte and lithium metal are in contact, a passivation layer is formed on the surface of the lithium metal due to the spontaneous decomposition of the electrolyte, which forms inert lithium and lithium dendrites, thereby reducing the efficiency and stability of the negative electrode. In addition, in the case of a lithium-sulfur battery using a sulfur-based material as a positive electrode active material, lithium polysulfide ($Li_2S_x$, usually x>4), which has the high oxidation number of sulfur, among lithium polysulfide ($Li_2S_x$, x=8, 6, 4, 2) formed in the positive electrode during the operation of the battery, has a high solubility in the electrolyte and thus is continuously dissolved therein and released outside the reaction zone of the positive electrode, thereby moving to the negative electrode. At this time, lithium polysulfide leached from the positive electrode causes a side reaction with lithium metal, thereby causing lithium sulfide to adhere to the surface of lithium metal and thus causing passivation of the electrode, and the utilization rate of sulfur is lowered due to the leaching of lithium polysulfide, so that only up to 70% of the theoretical discharging capacity can be realized, and as the cycle progresses, there is a problem that the capacity and charging/discharging efficiency are rapidly deteriorated, and the lifetime characteristics of the battery are low.

To this end, methods such as introduction of a protective layer on the surface of the lithium metal negative electrode, change of the composition of the electrolyte solvent, and the use of additives in the electrolyte are used in the prior art. However, these methods are not desirable for practical application, because they cause serious problems in the performance and operating stability of the battery due to compatibility problems with other elements constituting the battery.

Accordingly, the present invention provides an electrolyte for a lithium-sulfur battery, which can improve the efficiency and stability of the negative electrode and maximize the capacity of the positive electrode active material, thereby implementing a lithium-sulfur battery with improved capacity and lifetime characteristics.

Specifically, the electrolyte for the lithium-sulfur battery according to the present invention comprises a lithium salt, a non-aqueous organic solvent, and an additive, characterized in that the additive comprises a sulfide compound.

In the present invention, since the additive is a compound including a sulfide bond (—S—), is chemically inert, and has a polar structure capable of interacting with lithium ions, an improved stripping/plating process can be performed on the surface of lithium metal, which is a negative electrode. Accordingly, the efficiency and stability of the negative electrode are improved, and thus the capacity and lifetime characteristics of the lithium-sulfur battery comprising the same can be improved. The term "negative electrode efficiency" as used in the present invention refers to the percentage of lithium re-plated or re-reduced on the negative electrode, when fully charged, relative to the amount of lithium (or other negative electrode active material) newly stripped or oxidized from the negative electrode at the time of the preceding complete discharging of the battery. Any deviation from 100% indicates inert lithium whose utilization is lost in charging/discharging the battery.

In addition, the additive of the present invention can prevent the lithium polysulfide generated from the positive electrode from reacting with the lithium metal, thereby suppressing the loss of sulfur, and thus maximize the capacity expression of the positive electrode active material, thereby realizing a lithium-sulfur battery having an excellent capacity realization rate compared to the theoretical specific capacity.

In addition, since the additive of the present invention does not participate in the electrochemical reaction of the battery and only plays a role of improving the efficiency and stability of the negative electrode containing lithium metal, there is an advantage that the problem of deterioration in the performance of the battery occurring in the prior art does not occur.

As described above, the additive according to the present invention is the sulfide compound and may be represented by formula $R_1SR_2$ wherein $R_1$ and $R_2$ are not hydrogen, are the same as or different from each other, and are each independently a hydrocarbon group. The term "hydrocarbon group" used in the present invention refers to all organic groups composed of carbon and hydrogen and may comprise all known structures such as an alkyl group, alkenyl group, alkynyl group, aryl group, aralkyl, heteroaryl group, and the like. Any carbon in the hydrocarbon group may be replaced with at least one selected from the group consisting of oxygen (O), nitrogen (N) and sulfur (S). The hydrocarbon group comprises a straight chain, a branched chain, a monocycle or a polycycle, and one or more hydrogen atoms contained in the hydrocarbon group may be optionally substituted with one or more substituents (e.g. alkyl, alkenyl, alkynyl, heterocyclic, aryl, heteroaryl, acyl, oxo, imino, thiooxo, cyano, isocyano, amino, azido, nitro, hydroxyl, thiol, halo, etc.).

The sulfide compound may comprise at least one selected from the group consisting of methyl sulfide, ethyl sulfide, propyl sulfide, isopropyl sulfide, butyl sulfide, phenyl sulfide, benzyl sulfide, benzyl methyl sulfide and ethyl phenyl sulfide. Preferably, the sulfide compound may be at least one selected from the group consisting of ethyl sulfide, propyl sulfide, and benzyl sulfide, and more preferably, the sulfide compound may be benzyl sulfide.

The additive may be comprised in an amount of 0.1 to 30% by weight based on a total of 100% by weight of the electrolyte for the lithium-sulfur battery. The content of the additive may have a lower limit of 0.1% by weight or more, 0.2% by weight or more, or 0.5% by weight or more, and an upper limit of 30% by weight or less, 10% by weight or less, or 1.0% by weight or less, based on a total of 100% by weight of the electrolyte for the lithium-sulfur battery. The content of the additive may be set by a combination of the lower limit and the upper limit. When the content of the additive is less than the above range, since it cannot act on all of the lithium ions moving during charging/discharging, the uniformity of the stripping/plating process is deteriorated and thus the desired effect cannot be obtained. On the contrary, when the content of the additive exceeds the above range, as the content of inert electrolyte additive increases, there may be a problem that the solvent of the electrolyte becomes insufficient, thereby resulting in loss of capacity or shortening of the lifetime of the battery.

The electrolyte for the lithium-sulfur battery according to the present invention comprises a lithium salt as an electrolyte salt. The type of the lithium salt is not particularly limited in the present invention and may be used without limitation as long as it is commonly used in an electrolyte for a lithium-sulfur battery.

For example, the lithium salt may be at least one selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiC_4BO_8$, $LiAsF_6$, $LiSbF_6$, $LiAlCl_4$, $CH_3SO_3Li$, $CF_3SO_3Li$, $(CF_3SO_2)_2NLi$, $(C_2F_5SO_2)_2NLi$, $(SO_2F)_2NLi$, $(CF_3SO_2)_3CLi$, lithium chloroborane, lithium lower aliphatic carboxylates having 4 or less carbon atoms, lithium tetraphenyl borate, and lithium imide. Preferably, the lithium salt may be $(CF_3SO_2)_2NLi$ (lithium bis(trifluoromethanesulfonyl)imide; LiTFSI).

The concentration of the lithium salt may be appropriately determined in consideration of ion conductivity and solubility, and may be, for example, 0.1 to 4.0 M, preferably 0.5 to 2.0 M. When the concentration of the lithium salt is less than the above range, it is difficult to ensure ion conductivity suitable for operation of the battery. On the contrary, when the concentration of the lithium salt exceeds the above range, the viscosity of the electrolyte is increased, so that the mobility of lithium ions is deteriorated, and the decomposition reaction of the lithium salt itself is increased, thereby deteriorating the performance of the battery. Therefore, the concentration of the lithium salt is appropriately adjusted within the above range.

The electrolyte for the lithium-sulfur battery according to the present invention comprises a non-aqueous organic solvent as a medium through which ions involved in the electrochemical reaction of the lithium-sulfur battery can move, which is for dissolving the lithium salt.

In the present invention, the non-aqueous organic solvent includes an ether-based compound and a heterocyclic compound including one or more double bonds.

The ether-based compound allows electrochemical stability to be ensured within the range of the operating voltage of the battery, while maintaining the solubility of sulfur or sulfur-based compounds and has relatively little occurrence of side reactions with intermediate products due to the operation of the battery.

The ether-based compound may comprise at least one selected from the group consisting of a linear ether compound and a cyclic ether compound, and preferably the linear ether compound.

For example, the linear ether compound may be, but is not limited to, at least one selected from the group consisting of dimethyl ether, diethyl ether, dipropyl ether, methylethyl ether, methylpropyl ether, ethylpropyl ether, dimethoxyethane, diethoxyethane, ethylene glycol ethylmethyl ether, diethylene glycol dimethyl ether, diethylene glycol diethyl ether, diethylene glycol methylethyl ether, triethylene glycol dimethyl ether, triethylene glycol diethyl ether, triethylene glycol methylethyl ether, tetraethylene glycol dimethyl ether, tetraethylene glycol diethyl ether, tetraethylene glycol methylethyl ether, polyethylene glycol dimethyl ether, polyethylene glycol diethyl ether, polyethylene glycol methylethyl ether. The linear ether compound may be preferably at least one selected from the group consisting of dimethoxyethane, diethoxyethane, and diethyl ether, and more preferably dimethoxyethane.

As an example, the cyclic ether compound may be, but is not limited to, at least one selected from the group consisting of 1,3-dioxolane, 4,5-dimethyl-dioxolane, 4,5-diethyl-dioxolane, 4-methyl-1,3-dioxolane, 4-ethyl-1,3-dioxolane, tetrahydrofuran, 2-methyltetrahydrofuran, 2,5-dimethyltetrahydrofuran, 2,5-dimethoxytetrahydrofuran, 2-ethoxytetrahydrofuran, 2-methyl-1,3-dioxolane, 2-vinyl-1,3-dioxolane, 2,2-dimethyl-1,3-dioxolane, 2-methoxy-1,3-dioxolane, 2-ethyl-2-methyl-1,3-dioxolane, tetrahydropyran, 1,4-dioxane, 1,2-dimethoxy benzene, 1,3-dimethoxy benzene, 1,4-dimethoxy benzene, and isosorbide dimethyl ether.

The heterocyclic compound is a heterocyclic compound including one or more double bonds, and the heterocycle comprises at least one hetero atom selected from the group consisting of an oxygen atom and a sulfur atom. The heterocyclic compound includes an oxygen atom or a sulfur atom and exhibits polarity, thereby enhancing affinity with other components in the electrolyte, as well as suppressing side reactions and decomposition of the electrolyte.

The heterocyclic compound may be a 3 to 15-membered, preferably 3 to 7-membered, more preferably 5 to 6-membered heterocyclic compound.

In addition, the heterocyclic compound may be a heterocyclic compound substituted or unsubstituted by at least one selected from the group consisting of an alkyl group having 1 to 4 carbon atoms, a cyclic alkyl group having 3 to 8 carbon atoms, an aryl group having 6 to 10 carbon atoms, a halogen group, a nitro group ($-NO_2$), an amine group ($-NH_2$), and a sulfonyl group ($-SO_2$); or a multi-cyclic compound of at least one selected from the group consisting of a cyclic alkyl group having 3 to 8 carbon atoms and an aryl group having 6 to 10 carbon atoms and a heterocyclic compound.

For example, the heterocyclic compound may comprise at least one selected from the group consisting of furan, 2-methylfuran, 3-methylfuran, 2-ethylfuran, 2-propylfuran, 2-butylfuran, 2,3-dimethylfuran, 2,4-dimethylfuran, 2,5-dimethylfuran, pyran, 2-methylpyran, 3-methylpyran, 4-methylpyran, benzofuran, 2-(2-nitrovinyl)furan, thiophene, 2-methylthiophene, 2-ethylthiophene, 2-propylthiophene, 2-butylthiophene, 2,3-dimethylthiophene, 2,4-dimethylthiophene, and 2,5-dimethylthiophene. The heterocyclic compound may preferably comprise at least one selected from the group consisting of 2-methylfuran, 3-methylfuran, and 2-methylthiophene, and more preferably 2-methylfuran.

In the present invention, the non-aqueous organic solvent may comprise the ether-based compound and the heterocyclic compound in a volume ratio of 95:5 to 5:95, preferably 95:5 to 50:50, more preferably 90:10 to 50:50, most preferably 90:10 to 70:30. In the present invention, the volume ratio corresponds to the ratio of "% by volume of linear ether": "% by volume of heterocyclic compound" in the ether-based solvent. When the ether-based compound and the heterocyclic compound are included in the above-described volume ratio as the non-aqueous organic solvent, it may be effective in preventing a loss of a positive electrode active material and a decrease in ion conductivity of a lithium-sulfur battery. In particular, it is preferable to include the heterocyclic compound in a volume ratio of 5 or more relative to the total volume of the non-aqueous organic solvent. When the heterocyclic compound is contained in a volume ratio of less than 5 relative to the total volume of the non-aqueous organic solvent, there may be a problem of accelerating the deterioration of lifetime due to leaching of the positive electrode active material.

The electrolyte for the lithium-sulfur battery of the present invention may further include nitric acid or nitrous acid compounds in addition to the above-described components. The nitric acid or nitrous acid-based compound has an effect of forming a stable film on a lithium metal electrode, which is a negative electrode, and improving charging/discharging efficiency.

The nitric acid or nitrous acid-based compound is not particularly limited in the present invention, but may be at least one selected from the group consisting of inorganic nitric acid or nitrous acid compounds such as lithium nitrate ($LiNO_3$), potassium nitrate ($KNO_3$), cesium nitrate ($CsNO_3$), barium nitrate ($Ba(NO_3)_2$), ammonium nitrate ($NH_4NO_3$), lithium nitrite ($LiNO_2$), potassium nitrite ($KNO_2$), cesium nitrite ($CsNO_2$) and ammonium nitrite ($NH_4NO_2$); organic nitric acid or nitrous acid compounds such as methyl nitrate, dialkyl imidazolium nitrate, guanidine nitrate, imidazolium nitrate, pyridinium nitrate, ethyl nitrite, propyl nitrite, butyl nitrite, pentyl nitrite, and octyl nitrite; organic nitro compounds such as nitromethane, nitropropane, nitrobutane, nitrobenzene, dinitrobenzene, nitropyridine, dinitropyridine, nitrotoluene, dinitrotoluene, and combinations thereof, and preferably, lithium nitrate is used.

In addition, the electrolyte of the present invention may further include other additives for the purpose of improving charging/discharging characteristics, flame retardancy, and the like. Examples of the additives may be pyridine, triethylphosphite, triethanolamine, cyclic ether, ethylene diamine, n-glyme, hexamethyl phosphoric triamide, nitrobenzene derivatives, sulfur, quinoneimine dyes, N-substituted oxazolidinone, N,N-substituted imidazolidine, ethylene glycol dialkyl ether, ammonium salt, pyrrole, 2-methoxy ethanol, aluminum trichloride, fluoroethylene carbonate (FEC), propene sultone (PRS), vinylene carbonate (VC) and the like.

The electrolyte for the lithium-sulfur battery according to the present invention may improve the efficiency and stability of a negative electrode comprising lithium metal by comprising the sulfide compound as an additive. In addition, side reactions between lithium polysulfide and lithium metal generated during operation of an electrolyte or lithium-sulfur battery can be effectively suppressed. Accordingly, it is possible to improve the capacity and lifetime of the lithium-sulfur battery containing the electrolyte of the present invention.

In addition, the present invention provides a lithium-sulfur battery comprising the electrolyte for the lithium-sulfur battery.

The lithium-sulfur battery comprises a positive electrode; a negative electrode; and an electrolyte interposed therebetween, wherein the electrolyte comprises the electrolyte for the lithium-sulfur battery according to the present invention.

The positive electrode may include a positive electrode current collector and a positive electrode active material layer applied to one or both surfaces of the positive electrode current collector.

The positive electrode current collector supports the positive electrode active material and is not particularly limited as long as it has high conductivity without causing chemical changes in the relevant battery. For example, copper, stainless steel, aluminum, nickel, titanium, palladium, sintered carbon; copper or stainless steel surface-treated with carbon, nickel, silver or the like; aluminum-cadmium alloy or the like may be used as the positive electrode current collector.

The positive electrode current collector can enhance the bonding force with the positive electrode active material by having fine irregularities on its surface and may be formed in various forms such as film, sheet, foil, mesh, net, porous body, foam, or nonwoven fabric.

The positive electrode active material layer may comprise a positive electrode active material and may further comprise a conductive material, a binder, an additive, and the like.

The positive electrode active material comprises sulfur, and specifically may comprise at least one selected from the group consisting of elemental sulfur ($S_8$) and a sulfur compound. The positive electrode active material may be at least one selected from the group consisting of inorganic sulfur, $Li_2S_n(n≥1)$, a disulfide compound, an organic sulfur compound, and a carbon-sulfur polymer $((C_2S_x)_n: x=2.5$ to $50, n≥12)$. Preferably, the positive electrode active material may be inorganic sulfur.

The sulfur is used in combination with a conductive material such as a carbon material because it does not have electrical conductivity alone. Accordingly, the sulfur is comprised in the form of a sulfur-carbon composite, and preferably, the positive electrode active material may be a sulfur-carbon composite.

The carbon contained in the sulfur-carbon composite is a porous carbon material and provides a framework capable of uniformly and stably immobilizing sulfur and compensates for the low electrical conductivity of sulfur so that the electrochemical reaction can proceed smoothly.

The porous carbon material can generally be prepared by carbonizing various carbonaceous precursors. The porous carbon material may comprise uneven pores therein, the average diameter of the pores is in the range of 1 to 200 nm, and the porosity may range from 10 to 90% of the total volume of the porous carbon material. When the average diameter of the pores is less than the above range, the pore size is only at the molecular level and impregnation with sulfur is impossible. On the contrary, when the average diameter of the pores exceeds the above range, the mechanical strength of the porous carbon material is weakened, which is not preferable for application to the manufacturing process of the electrode.

The shape of the porous carbon material is in the form of sphere, rod, needle, plate, tube, or bulk, and can be used without limitation as long as it is commonly used in a lithium-sulfur battery.

The porous carbon material may have a porous structure or a high specific surface area, and may be any of those conventionally used in the art. For example, the porous carbon material may be, but is not limited to, at least one selected from the group consisting of graphite; graphene; carbon blacks such as Denka black, acetylene black, Ketjen black, channel black, furnace black, lamp black, and thermal black; carbon nanotubes (CNTs) such as single wall carbon nanotube (SWCNT) and multiwall carbon nanotubes (MWCNT); carbon fibers such as graphite nanofiber (GNF), carbon nanofiber (CNF), and activated carbon fiber (ACF); and graphite such as natural graphite, artificial graphite and expanded graphite, and activated carbon. Preferably, the porous carbon material may be carbon nanotubes.

The sulfur-carbon composite may include 60 to 90 parts by weight, preferably 65 to 85 parts by weight, more preferably 70 to 80 parts by weight of sulfur, based on 100 parts by weight of the sulfur-carbon composite. When the content of sulfur is less than the above-described range, as the content of the porous carbon material in the sulfur-carbon composite is relatively increased, the specific surface area is increased and thus when manufacturing the positive electrode, the content of the binder is increased. This increase in the amount of use of the binder eventually increases the sheet resistance of the positive electrode and acts as an insulator to prevent electron pass, thereby deteriorating the performance of the battery. On the contrary, when the content of sulfur exceeds the above-described range, sulfur, which cannot be combined with the porous carbon material, aggregates with each other, or is re-leached to the surface of the porous carbon material, and thus is difficult to receive electrons, and cannot participate in electrochemical reactions, thereby resulting in loss of battery capacity.

In addition, the sulfur in the sulfur-carbon composite is located on at least one of the inner and outer surfaces of the aforementioned porous carbon material, and at this time, may exist in an area of less than 100%, preferably 1 to 95%, more preferably 60 to 90% of the entire inner and outer surface of the porous carbon material. When sulfur as described above is present on the inner and outer surfaces of the porous carbon material within the above range, the maximum effect may be exhibited in terms of an electron transfer area and wettability with an electrolyte. Specifically, since sulfur is thinly and evenly impregnated on the inner and outer surfaces of the porous carbon material in the above range, the electron transfer contact area can be increased during the charging/discharging process. When sulfur is located in an area of 100% of the entire inner and outer surface of the porous carbon material, the carbon material is completely covered with sulfur, so that it has poor wettability to the electrolyte and poor contact with the conductive material included in the electrode, so that it cannot receive electrons and thus cannot participate in the electrochemical reaction.

The method for preparing the sulfur-carbon composite is not particularly limited in the present invention, and a method commonly used in the art may be used. As an example, a method of simply mixing sulfur and the porous carbon material and then heat-treating them to form a composite may be used.

The positive electrode active material may further comprise at least one additive selected from a transition metal element, a group IIIA element, a group IVA element, a sulfur compound of these elements, and an alloy of these elements and sulfur, in addition to the above-described components.

The transition metal element may comprise Sc, Ti, V, Cr, Mn, Fe, Co, Ni, Cu, Zn, Y, Zr, Nb, Mo, Tc, Ru, Rh, Pd, Os, Ir, Pt, Au, Hg and the like, and the group IIIA element may comprise Al, Ga, In, Tl and the like, and the group IVA element may comprise Ge, Sn, Pb, and the like.

The positive electrode active material may be included in an amount of 40 to 95% by weight, preferably 45 to 90% by weight, more preferably 60 to 90% by weight, based on a total of 100% by weight of the positive electrode active material layer constituting the positive electrode. When the content of the positive electrode active material is less than the above range, it is difficult to sufficiently exhibit the electrochemical reaction of the positive electrode. On the contrary, when the content exceeds the above range, the content of the conductive material and the binder to be described later is relatively insufficient, and thus there is a problem that the resistance of the positive electrode increases, and the physical properties of the positive electrode decrease.

The positive electrode active material layer may further selectively include a conductive material which allows electrons to move smoothly within the positive electrode (specifically, the positive electrode active material), and binder for well attaching the positive electrode active material to the current collector.

The conductive material is a material that acts as a path, through which electrons are transferred from the current collector to the positive electrode active material, by electrically connecting the electrolyte and the positive electrode active material. The conductive material can be used without limitation as long as it has electrical conductivity.

For example, as the conductive material, graphite such as natural graphite or artificial graphite; carbon blacks such as Super-P, Denka black, acetylene black, Ketjen black, channel black, furnace black, lamp black, and thermal black; carbon derivatives such as carbon nanotubes and fullerenes; electrically conductive fibers such as carbon fibers and metal fibers; carbon fluoride; metal powders such as aluminum and nickel powder; or electrically conductive polymers such as polyaniline, polythiophene, polyacetylene, and polypyrrole may be used alone or in combination.

The conductive material may be included in an amount of 1 to 10% by weight, preferably 4 to 7% by weight, based on a total of 100% by weight of the positive electrode active material layer constituting the positive electrode. When the content of the electrically conductive material is less than the above range, it is difficult to transfer electrons between the positive electrode active material and the current collector, thereby reducing voltage and capacity. On the contrary, when the content exceeds the above range, the proportion of positive electrode active material is relatively reduced and thus the total energy (charge amount) of the battery can be reduced. Therefore, it is preferable that the content of the electrically conductive material is determined to be an appropriate content within the above-described range.

The binder maintains the positive electrode active material in the positive electrode current collector, and organically connects the positive electrode active materials to increase the bonding force between them, and any binder known in the art may be used.

For example, the binder may be any one selected from fluororesin-based binders comprising polyvinylidene fluoride (PVdF) or polytetrafluoroethylene (PTFE); rubber-based binders comprising styrene butadiene rubber (SBR), acrylonitrile-butadiene rubber, and styrene-isoprene rubber; cellulose-based binders comprising carboxymethylcellulose (CMC), starch, hydroxy propyl cellulose, and regenerated cellulose; polyalcohol-based binders; polyolefin-based binders comprising polyethylene and polypropylene; polyimide-based binders; polyester-based binders; and silane-based binders, or mixtures or copolymers of two or more thereof.

The content of the binder may be 1 to 10% by weight based on a total of 100% by weight of the positive electrode active material layer constituting the positive electrode. When the content of the binder is less than 0.5% by weight, the physical properties of the positive electrode may be degraded and thus the positive electrode active material and conductive material may be eliminated. When the content exceeds the above range, the ratio of the positive electrode active material and the conductive material in the positive electrode may be relatively reduced, so that the capacity of the battery may be reduced. Therefore, it is preferable that the content of the binder is determined to be an appropriate content within the above-described range.

In the present invention, the method of manufacturing the positive electrode is not particularly limited and may be a known method by a person skilled in the art or various modified methods thereof.

As an example, the positive electrode may be prepared by preparing a slurry composition for a positive electrode comprising the above-described components, and then applying it to at least one surface of the positive electrode current collector.

The slurry composition for a positive electrode comprises the positive electrode active material, a conductive material, and a binder as described above, and may further comprise a solvent other than the above.

As the solvent, one capable of uniformly dispersing a positive electrode active material, an electrically conductive material, and a binder is used. Such a solvent is an aqueous solvent, and water is most preferred, and in this case, water may be distilled water or deionizied water. However, it is not necessarily limited thereto, and if necessary, a lower alcohol that can be easily mixed with water may be used. Examples of the lower alcohol include methanol, ethanol, propanol, isopropanol, and butanol, and preferably, they may be used in combination with water.

The content of the solvent may be contained at a level having a concentration that allows easy coating, and the specific content varies depending on the application method and apparatus.

The slurry composition for a positive electrode may additionally contain, if necessary, materials commonly used for the purpose of improving its function in the relevant technical field as necessary. For example, a viscosity modifier, a fluidizing agent, a filler, etc. are mentioned.

The method of applying the slurry composition for a positive electrode is not particularly limited in the present invention, and for example, methods such as a doctor blade method, a die casting method, a comma coating method, and a screen printing method can be used. In addition, after being molded on a separate substrate, the slurry for the positive electrode may be applied on the positive electrode current collector by a pressing or lamination method.

After the application, a drying process for removing the solvent may be performed. The drying process is performed at a temperature and time at a level capable of sufficiently removing the solvent, and the conditions may vary depending on the type of the solvent, and thus are not particularly limited in the present invention. Examples of the drying method may comprise a drying method by warm air, hot air, or low-humidity air, a vacuum drying method, and a drying method by irradiation with (far)-infrared radiation or electron beam. The drying rate is usually adjusted so that the solvent can be removed as quickly as possible within a speed range that does not cause cracks in the positive electrode active material layer due to the concentration of stress and does not delaminate the positive electrode active material layer from the positive electrode current collector.

Additionally, the density of the positive electrode active material in the positive electrode may be increased by pressing the current collector after drying. Methods, such as a mold press and a roll press, are mentioned as a press method.

The porosity of the positive electrode, specifically, the positive electrode active material layer prepared by the above-described composition and manufacturing method may be 40 to 80%, preferably 60 to 75%. When the porosity of the positive electrode is less than 40%, since the degree of filling of the slurry composition for the positive electrode comprising a positive electrode active material, an electrically conductive material, and a binder becomes too high, there are problems that sufficient electrolyte to exhibit ion conduction and/or electrical conduction between positive electrode active materials cannot be maintained, and thus output characteristics or cycle characteristics of the battery may be deteriorated, the overvoltage and the reduction in discharging capacity become serious. On the contrary, when the porosity of the positive electrode exceeds 80% and has an excessively high porosity, there is a problem that the physical and electrical connection with the current collector is lowered and thus adhesion is lowered and the reaction becomes difficult, and there is a problem that the increased porosity is filled by the electrolyte and thus the energy density of the battery is lowered. Therefore, the porosity of the positive electrode is appropriately adjusted within the above range.

In addition, the loading amount of sulfur in the positive electrode according to the present invention, that is, the mass of sulfur per unit area of the positive electrode active material layer in the positive electrode may be 2 to 15 mg/cm$^2$, preferably 2.5 to 5 mg/cm$^2$.

The negative electrode may comprise a negative electrode current collector and a negative electrode active material layer applied to one or both surfaces of the negative electrode current collector. Alternatively, the negative electrode may be a lithium metal plate.

The negative electrode current collector is for supporting the negative electrode active material layer and is as described in the positive electrode current collector.

The negative electrode active material layer may comprise a conductive material, a binder, etc. in addition to the negative electrode active material. At this time, the conductive material and the binder are as described above.

The negative electrode active material may comprise a material capable of reversibly intercalating or de-intercalating lithium ion (Li$^+$), a material capable of reacting with lithium ion to reversibly form lithium containing compounds, lithium metal, or lithium alloy.

The material capable of reversibly intercalating or de-intercalating lithium ion (Li$^+$) can be, for example, crystalline carbon, amorphous carbon, or a mixture thereof. The material capable of reacting with lithium ion (Li$^+$) to reversibly form lithium containing compounds may be, for example, tin oxide, titanium nitrate, or silicon. The lithium alloy may be, for example, an alloy of lithium (Li) and a metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn).

Preferably, the negative electrode active material may be lithium metal, and specifically, may be in the form of a lithium metal thin film or a lithium metal powder.

The method of forming the negative electrode active material is not particularly limited, and may include a method of forming a layer or film commonly used in the art. For example, methods such as compression, coating, or deposition can be used. In addition, a metal lithium thin film formed on a metal plate by initial charging after assembling the battery without the lithium thin film in the current collector is also comprised in the negative electrode of the present invention.

The electrolyte is for causing an electrochemical oxidation or reduction reaction between the positive electrode and the negative electrode through them and is as described above.

The injection of the electrolyte may be performed at an appropriate stage of the manufacturing processes of the lithium-sulfur battery, depending on the manufacturing process and required properties of the final product. That is, the injection can be performed before assembling the lithium-sulfur battery or at the final stage of assembling the lithium-sulfur battery.

A separator may be additionally comprised between the positive electrode and the negative electrode.

The separator may be made of a porous non-conductive or insulating material that separates or insulates the positive electrode and the negative electrode from each other and enables transport of lithium ions between the positive electrode and the negative electrode. The separator may be used without special limitation as long as it is used as a separator in a conventional lithium-sulfur battery. The separator may be an independent member such as a film or may comprise a coating layer added to the positive and/or negative electrodes.

It is preferable that the separator has excellent wettability to the electrolyte while having low resistance to ion migration of the electrolyte.

The separator may be made of a porous substrate, and the porous substrate may be used as long as it is a porous substrate commonly used for a lithium-sulfur battery, and porous polymer films may be used alone or by laminating them, and for example, a nonwoven fabric or a polyolefin-based porous membrane made of glass fibers, polyethylene terephthalate fibers, etc. having a high melting point may be used, but is not limited thereto.

The material of the porous substrate is not particularly limited in the present invention, and any material can be used as long as it is a porous substrate commonly used in an electrochemical device. For example, the porous substrate may comprise at least one material selected from the group consisting of polyolefin such as polyethylene and polypropylene, polyester such as polyethyleneterephthalate and polybutyleneterephthalate, polyamide, polyacetal, polycarbonate, polyimide, polyetheretherketone, polyethersulfone, polyphenyleneoxide, polyphenylenesulfide, polyethylenenaphthalate, polytetrafluoroethylene, polyvinylidene fluoride, polyvinyl chloride, polyacrylonitrile, cellulose, nylon, poly(p-phenylene benzobisoxazole), and polyarylate.

The thickness of the porous substrate is not particularly limited, but may be 1 to 100 μm, preferably 5 to 50 μm. Although the thickness range of the porous substrate is not particularly limited to the above-mentioned range, when the thickness is excessively thinner than the lower limit described above, mechanical properties are deteriorated and thus the separator may be easily damaged during use of the battery.

The average diameter and porosity of the pores present in the porous substrate are also not particularly limited, but may be 0.001 μm to 50 μm and 10 to 95%, respectively.

The lithium-sulfur battery according to the present invention can be manufactured by lamination, stacking, and folding processes of the separator and the electrodes, in addition to the usual winding process.

The shape of the lithium-sulfur battery is not particularly limited and may be various shapes such as a cylindrical shape, a laminate shape, and a coin shape.

Also, the present invention provides a battery module comprising the lithium-sulfur battery described above as a unit battery.

The battery module may be used as a power source for medium to large-sized devices requiring high temperature stability, long cycle characteristics, high capacity characteristics, and the like.

Examples of such medium to large-sized devices may comprise, but are not limited to, a power tool powered and moved by an electric motor; an electric car including an electric vehicle (EV), a hybrid electric vehicle (HEV), a plug-in hybrid electric vehicle (PHEV), and the like; an electric motorcycle including an electric bike (E-bike) and an electric scooter (E-scooter); an electric golf cart; a power storage system, etc.

MODE FOR INVENTION

Hereinafter, preferred examples of the present invention will be described in order to facilitate understanding of the present invention. It will be apparent to those skilled in the art, however, that the following examples are only illustrative of the present invention and various changes and modifications can be made within the scope and spirit of the present invention, and that such variations and modifications are within the scope of the appended claims.

EXAMPLE AND COMPARATIVE EXAMPLE

Example 1

87.5% by weight of sulfur-carbon composite (S:C=75:25 (weight ratio)) as a positive electrode active material, 5.0% by weight of Denka black as a conductive material, and 7.5% by weight of styrene butadiene rubber/carboxymethyl cellulose as a binder (SBR:CMC=70:30 (weight ratio)) were mixed to prepare a positive electrode slurry composition.

The prepared positive electrode slurry composition was coated on an aluminum current collector having a thickness of 20 μm, dried at 100° C. for 12 hours, and pressed with a roll press to prepare a positive electrode. At this time, the loading amount of the positive electrode active material was 3.7 mAh/cm$^2$ or less, and the porosity of the positive electrode was 70%.

A lithium metal thin film having a thickness of 20 μm was used as a negative electrode.

A solution was prepared by dissolving 0.75 M LiTFSI and 1.0% by weight of lithium nitrate in the organic solvent consisting of 2-methylfuran and dimethoxyethane (2-methylfuran:DME=50:50 (volume ratio)). Subsequently, 0.1% by weight of benzyl sulfide was added to the solution to prepare an electrolyte.

A lithium-sulfur battery was prepared by placing the prepared positive electrode and negative electrode to face each other, interposing a polyethylene separator having a thickness of 16 μm and a porosity of 45%, and injecting 70 μℓ of the previously prepared electrolyte.

Example 2

A lithium-sulfur battery was manufactured in the same manner as in Example 1, except that when preparing electrolyte, the content of benzyl sulfide was changed to 0.5% by weight.

Example 3

A lithium-sulfur battery was manufactured in the same manner as in Example 1, except that when preparing electrolyte, the content of benzyl sulfide was changed to 1.0% by weight.

Example 4

A lithium-sulfur battery was manufactured in the same manner as in Example 1, except that when preparing electrolyte, ethyl sulfide instead of benzyl sulfide was used in the same amount.

Example 5

A lithium-sulfur battery was manufactured in the same manner as in Example 1, except that when preparing electrolyte, 0.1% by weight of benzyl sulfide was changed to 0.5% by weight of ethyl sulfide.

Example 6

A lithium-sulfur battery was manufactured in the same manner as in Example 1, except that when preparing electrolyte, 0.1% by weight of benzyl sulfide was changed to 1.0% by weight of ethyl sulfide.

Example 7

A lithium-sulfur battery was manufactured in the same manner as in Example 1, except that when preparing electrolyte, propyl sulfide instead of benzyl sulfide was used in the same amount.

Example 8

A lithium-sulfur battery was manufactured in the same manner as in Example 1, except that when preparing electrolyte, 0.1% by weight of benzyl sulfide was changed to 0.5% by weight of propyl sulfide.

Example 9

A lithium-sulfur battery was manufactured in the same manner as in Example 1, except that when preparing electrolyte, 0.1% by weight of benzyl sulfide was changed to 1.0% by weight of propyl sulfide.

Example 10

A lithium-sulfur battery was manufactured in the same manner as in Example 1, except that when preparing electrolyte, the organic solvent consisting of 2-methylfuran and dimethoxyethane (2-methylfuran:DME=40:60 (volume ratio)) was used.

Example 11

A lithium-sulfur battery was manufactured in the same manner as in Example 1, except that when preparing electrolyte, the organic solvent consisting of 2-methylfuran and dimethoxyethane (2-methylfuran:DME=40:60 (volume ratio)) was used and the content of benzyl sulfide was changed to 0.5% by weight.

Example 12

A lithium-sulfur battery was manufactured in the same manner as in Example 1, except that when preparing electrolyte, the organic solvent consisting of 2-methylfuran and dimethoxyethane (2-methylfuran:DME=40:60 (volume ratio)) was used and the content of benzyl sulfide was changed to 1.0% by weight.

Comparative Example 1

A lithium-sulfur battery was manufactured in the same manner as in Example 1, except that when preparing electrolyte, benzyl sulfide was not used.

Comparative Example 2

A lithium-sulfur battery was manufactured in the same manner as in Example 1, except that when preparing electrolyte, the organic solvent consisting of 2-methylfuran and dimethoxyethane (2-methylfuran:DME=40:60 (volume ratio)) was used and benzyl sulfide was not used.

Experimental Example 1. Cyclic Voltammetry Analysis Of Electrolyte

The electrochemical reactivity of the electrolytes prepared in Example 3 and Comparative Example 1 was evaluated using cyclic voltammetry (CV).

Specifically, a three-electrode electrochemical cell using a carbon electrode as a working electrode, which was prepared by mixing carbon nanotubes (FT9111, manufactured by C-nano company), polyacrylic acid and polyvinyl alcohol in a weight ratio of 8:1:1, and lithium metal thin films having a thickness of 20 μm as a reference electrode and a counter electrode respectively was used. At this time, the scan was performed by performing one cycle from 2.5 V to −0.1 V and from −0.1 V to 2.5 V (potential vs. Li/Li$^+$), and the scan speed was 0.1 mV/s. The results obtained at this time were shown in FIG. 1.

Referring to FIG. 1, it can be seen that in the case of Example 3 in which the sulfide compound was added, no additional reduction peak was observed, as compared to Comparative Example 1 in which the sulfide compound was not added. From this, it can be seen that the sulfide compound incorporated as an additive in the electrolyte does not undergo a direct electrochemical reaction on the surface of the negative electrode.

Experimental Example 2. Evaluation of Battery Performance (1) Measurement of Capacity Characteristics For the batteries prepared in Examples and Comparative Examples, capacity characteristics were evaluated using a charging/discharging measuring device (LAND CT-2001A, manufactured by Wuhan company).

Specifically, charging/discharging of 40 cycles was repeated under the charging/discharging conditions of 0.5 C/0.1 C, and the results obtained at this time were shown in Tables 1 and 2.

(2) Measurement of Lifetime Characteristics

For the batteries manufactured in Examples 1 to 3 and Comparative Example 1, lifetime characteristics were evaluated using a charging/discharging measuring device (LAND CT-2001A, manufactured by Wuhan company).

Specifically, the lifetime characteristics were measured by repeating the initial 2.5 cycles of discharging at 0.1 C up to 1.8 V and charging at 0.1 C up to 2.5 V at 25° C., and then charging/discharging at 0.2 C/0.2 C for 3 cycles, and thereafter, repeating 300 cycles of charging/discharging at 0.5 C/1.0 C for Examples 1 and 2 and at 0.3 C/0.5 C for Example 3. In the case of Comparative Example 1, the experiment was performed under the same conditions as in the Example in which the experiment was conducted together with this. The results obtained at this time were shown in FIGS. 2 to 4.

TABLE 1

| | Discharging capacity per unit weight of positive electrode active material (mAh/$g_{sulfur}$@$7^{th}$) | Discharging capacity per unit weight of positive electrode active material (mAh/$g_{sulfur}$@$200^{th}$) | Efficiency (%@$200^{th}$) |
|---|---|---|---|
| Example 1 | 780 | 531 | 98.89084 |
| Example 2 | 792 | 547 | 98.89111 |
| Example 3 | 799 | 552 | 98.89072 |
| Example 4 | 750 | 517 | 98.7720 |
| Example 5 | 752 | 536 | 98.8716 |
| Example 6 | 767 | 553 | 98.9136 |
| Example 7 | 725 | 518 | 98.36048 |
| Example 8 | 734 | 526 | 98.85864 |
| Example 9 | 752 | 546 | 98.82879 |
| Comparative Example 1 | 717 | 368 | 98.13161 |

TABLE 2

| | Discharging capacity per unit weight of positive electrode active material (mAh/$g_{sulfur}$@$7^{th}$) | Discharging capacity per unit weight of positive electrode active material (mAh/$g_{sulfur}$@$100^{th}$) | Efficiency (%@$100^{th}$) |
|---|---|---|---|
| Example 10 | 798 | 657 | 96.3027 |
| Example 11 | 805 | 674 | 96.3425 |
| Example 12 | 816 | 691 | 96.3809 |
| Comparative Example 2 | 735 | 612 | 95.5837 |

Figure 2:
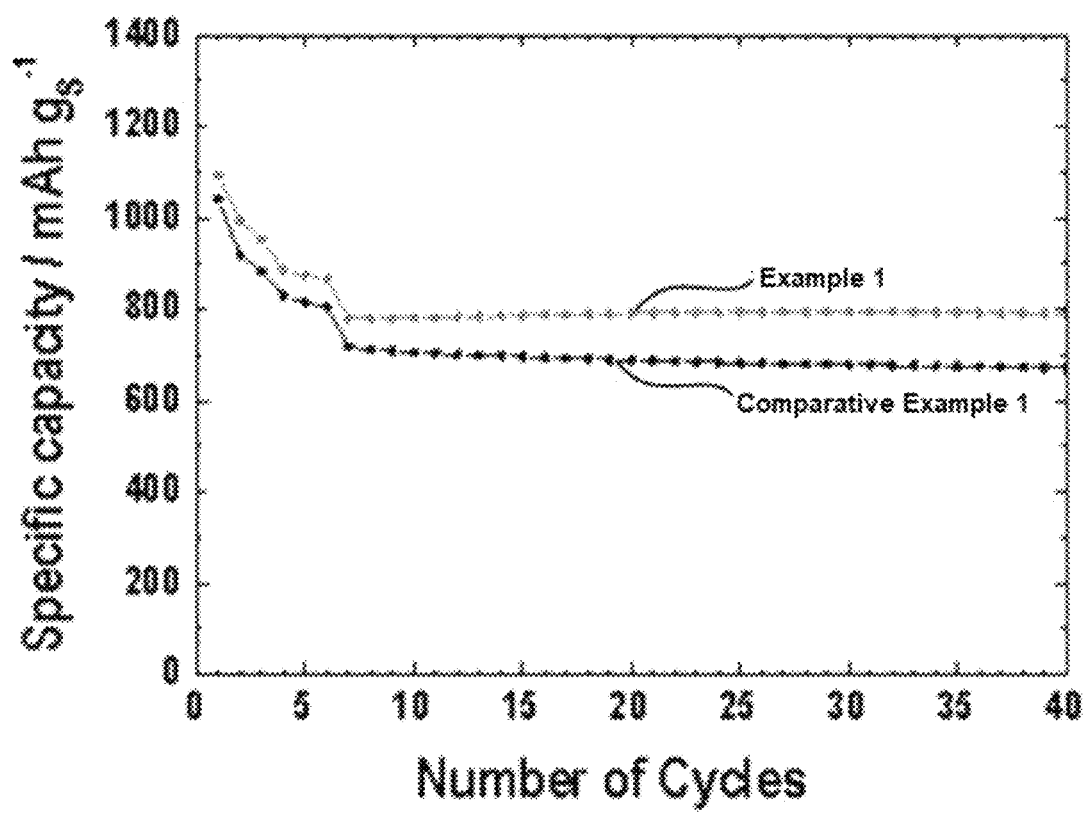
FIG. 2 is a graph showing results of evaluation of lifetime characteristics of lithium-sulfur batteries according to Example 1 and Comparative Example 1.
Figure 3:
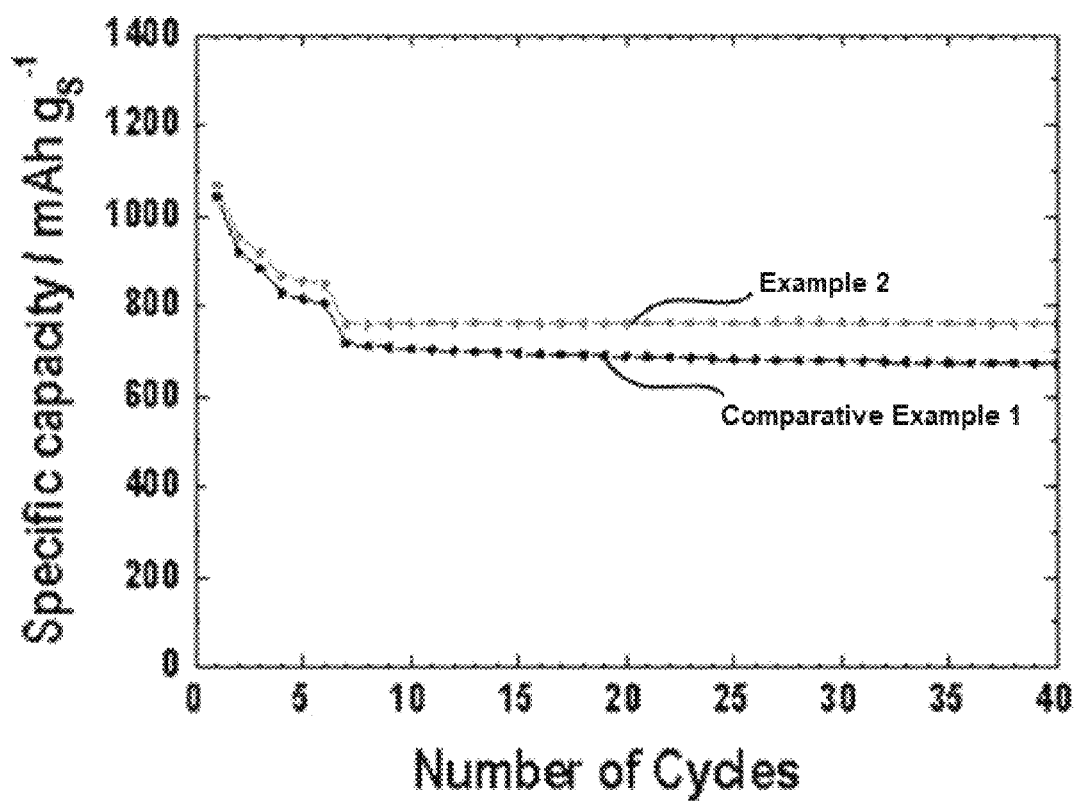
FIG. 3 is a graph showing results of evaluation of lifetime characteristics of lithium-sulfur batteries according to Example 2 and Comparative Example 1.
Figure 4:
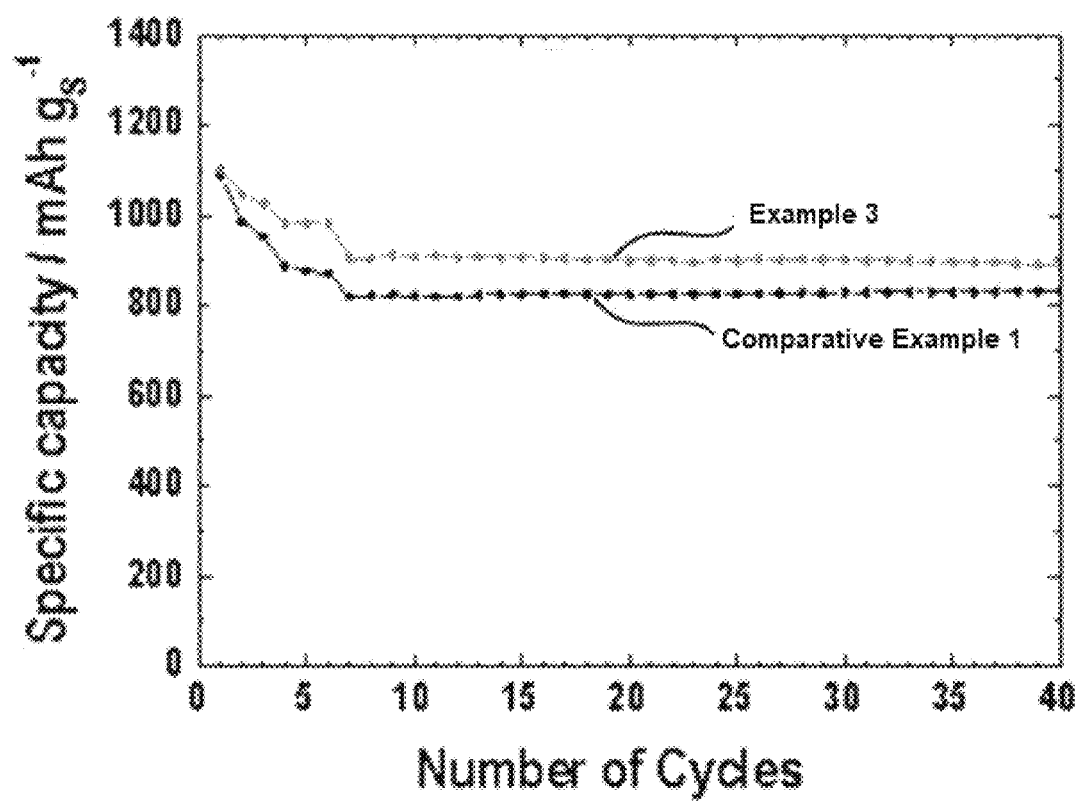
FIG. 4 is a graph showing results of evaluation of lifetime characteristics of lithium-sulfur batteries according to Example 3 and Comparative Example 1.

As shown in FIGS. 2 to 4 and Tables 1 and 2, it can be seen that in the case of the batteries according to Examples, the capacity and lifetime characteristics are superior to those of Comparative Examples.

Specifically, referring to Table 1, it can be seen that the battery of Example 1 manufactured by using an electrolyte comprising a sulfide compound as an additive exhibits about 10% higher capacity characteristics than Comparative Example 1 at the 7th cycle, and the difference is further increased at the 200th cycle. In addition, the difference in efficiency between the batteries of Example 1 and Comparative Example 1 is 0.76%, which can be said to be very large.

Also, referring to Table 2, it can be seen that even when the volume ratio of the two compounds contained in the organic solvent is different, the capacity and efficiency characteristics of the batteries according to the Examples are superior to those of the Comparative Examples.

In addition, it can be seen from FIGS. 2 to 4 that the batteries of Examples 1 to 3 have high capacity and also excellent capacity retention during charging/discharging cycles as compared to the battery of Comparative Example 1.

From these results, it can be seen that the lithium-sulfur battery of the present invention may improve capacity and lifetime characteristics of a lithium-sulfur battery by including an electrolyte comprising a sulfide compound as an additive.

The invention claimed is:

1. An electrolyte for a lithium-sulfur battery comprising:
   a lithium salt;
   a non-aqueous organic solvent comprising an ether-based compound and a heterocyclic compound; and
   an additive, wherein the additive comprises a sulfide compound,
   wherein the heterocyclic compound comprises at least one selected from the group consisting of furan, 2-methylfuran, 3-methylfuran, 2-ethylfuran, 2-propylfuran, 2-butylfuran, 2,3-dimethylfuran, 2,4-dimethylfuran, 2,5-dimethylfuran, pyran, 2-methylpyran, 3-methylpyran, 4-methylpyran, benzofuran, 2-(2-nitrovinyl)furan, thiophene, 2-methylthiophene, 2-ethylthiophene, 2-propylthiophene, 2-butylthiophene, 2,3-dimethylthiophene, 2,4-dimethylthiophene and 2,5-dimethylthiophene,
   wherein the additive is present in an amount of 0.1 to 10% by weight based on a total of 100% by weight of the electrolyte for the lithium-sulfur battery, and
   wherein the sulfide compound comprises at least one selected from the group consisting of methyl sulfide, ethyl sulfide, propyl sulfide, isopropyl sulfide, butyl sulfide, phenyl sulfide, benzyl sulfide, benzyl methyl sulfide, and ethyl phenyl sulfide.

2. The electrolyte for the lithium-sulfur battery according to claim 1, wherein the ether-based compound comprises a linear ether compound.

3. The electrolyte for the lithium-sulfur battery according to claim 2, wherein the linear ether compound comprises at least one selected from the group consisting of dimethyl ether, diethyl ether, dipropyl ether, methylethyl ether, methylpropyl ether, ethylpropyl ether, dimethoxyethane, diethoxyethane, ethylene glycol ethylmethyl ether, diethylene glycol dimethyl ether, diethylene glycol diethyl ether, diethylene glycol methylethyl ether, triethylene glycol dimethyl ether, triethylene glycol diethyl ether, triethylene glycol methylethyl ether, tetraethylene glycol dimethyl ether, tetraethylene glycol diethyl ether, tetraethylene glycol methylethyl ether, polyethylene glycol dimethyl ether, polyethylene glycol diethyl ether, and polyethylene glycol methylethyl ether.

4. The electrolyte for the lithium-sulfur battery according to claim 1, wherein the non-aqueous organic solvent comprises the ether-based compound and the heterocyclic compound in a volume ratio of 95:5 to 5:95.

5. The electrolyte for the lithium-sulfur battery according to claim 1, wherein the lithium salt comprises at least one selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiCABO$_8$, LiAsF$_6$, LiSbF$_6$, LiAlCl$_4$, CH$_3$SO$_3$Li, CF$_3$SO$_3$Li, (CF$_3$SO$_2$)$_2$NLi, (C$_2$F$_5$SO$_2$)$_2$NLi, (SO$_2$F)$_2$NLi, (CF$_3$SO$_2$)$_3$CLi, lithium chloroborane, lithium lower aliphatic carboxylates having 4 or less carbon atoms, lithium tetraphenyl borate, and lithium imide.

6. The electrolyte for the lithium-sulfur battery according to claim 1, wherein the additive is present in an amount of 0.1 to 1% by weight based on a total of 100% by weight of the electrolyte for the lithium-sulfur battery.

7. A lithium-sulfur battery comprising,
   a positive electrode comprising a positive electrode active material;
   a negative electrode comprising a negative electrode active material; and
   an electrolyte comprising the electrolyte according to claim 1.

8. The lithium-sulfur battery according to claim 7, wherein the positive electrode active material comprises at least one selected from the group consisting of elemental sulfur and a sulfur compound.

9. The lithium-sulfur battery according to claim 7, wherein the positive electrode active material comprises at least one selected from the group consisting of inorganic sulfur, Li$_2$S$_n$(n≥1), a disulfide compound, an organic sulfur compound, and a carbon-sulfur polymer ((C$_2$S$_x$)$_n$, X=2.5 to 50, n≥2).

10. The lithium-sulfur battery according to claim 7, wherein the negative electrode active material comprises at least one selected from the group consisting of lithium metal and lithium alloy.

* * * * *